United States Patent

Ochi et al.

[11] Patent Number: 6,002,429
[45] Date of Patent: Dec. 14, 1999

[54] IMAGE INPUT DEVICE IN WHICH THE IMAGE SENSING CONDITIONS ARE CHANGED DEPENDING ON A DATA FORMAT REQUIRED BY AN EXTERNAL DEVICE

[75] Inventors: Keizou Ochi, Takatsuki; Takashi Iida, Kyoto; Hideyuki Kanbayashi, Sagamihara; Takashi Kondo, Sakai, all of Japan

[73] Assignee: Minolta Co., Ltd., Osaka, Japan

[21] Appl. No.: 08/653,685

[22] Filed: May 23, 1996

[30] Foreign Application Priority Data

Jun. 1, 1995 [JP] Japan .................................. 7-135011

[51] Int. Cl.⁶ .................................................. H04N 5/225
[52] U.S. Cl. ........................................ 348/207; 348/220
[58] Field of Search .................................. 348/441, 445, 348/390, 96, 97, 98, 207, 335, 343, 344, 220; 359/202, 213, 196, 359, 474, 480, 481, 494, 497; 250/234, 235, 208.1; 358/505, 513, 442; H04N 5/225

[56] References Cited

U.S. PATENT DOCUMENTS

| | | | |
|---|---|---|---|
| 4,712,142 | 12/1987 | Tomita et al. | 358/285 |
| 5,067,020 | 11/1991 | Funston | 348/112 |
| 5,396,290 | 3/1995 | Kannegundla et al. | 348/312 |
| 5,473,370 | 12/1995 | Mononaga et al. | 348/231 |

FOREIGN PATENT DOCUMENTS

| | | |
|---|---|---|
| 4-70269 | 3/1992 | Japan . |
| 4-70273 | 3/1992 | Japan . |
| 4-70274 | 3/1992 | Japan . |
| 4-70275 | 3/1992 | Japan . |
| 4-70279 | 3/1992 | Japan . |
| 4-70283 | 3/1992 | Japan . |
| 4-70284 | 3/1992 | Japan . |

*Primary Examiner*—Tuan Ho
*Attorney, Agent, or Firm*—Burns, Doane, Swecker & Mathis, LLP

[57] ABSTRACT

An image sensing device that provides image data to an external device adjusts the resolution at which the image is sensed in accordance with format requirements of the external device. The format requirements of the external device can be automatically detected, or entered by a user. The operating parameters of a line sensor, to scan the image in a subscanning direction, are varied in accordance with the format requirements. These operating parameters can be the integration cycle of the sensor, and/or the speed at which the image is optically scanned past the sensor.

26 Claims, 8 Drawing Sheets

IMAGE INPUT DEVICE IN WHICH THE IMAGE SENSING CONDITIONS ARE CHANGED DEPENDING ON A DATA FORMAT REQUIRED BY AN EXTERNAL DEVICE

BACKGROUND OF THE INVENTION

1. Field of the Invention

The present invention pertains to an image input device such as an electronic still camera or image reader, in which image data obtained by sensing an image is provided to an external device by means of an output interface.

2. Description of the Prior Art

Various types of image input devices have been conventionally used to receive an image of an object or text and to convert it into image data. For example, in order to sense the still image of a person or scenery, electronic still cameras having built-in CCD sensors are used. An electronic still camera outputs, or downloads, image data obtained through image sensing to a TV monitor, personal computer, etc., such that the sensed image may be displayed on the screen or printed. Image readers are used to sense the image of text. An image reader outputs image data obtained through image sensing to an image processing device such as a high precision color printer or workstation, such that the sensed image may be printed or stored in a memory device.

In a conventional image input device as described above, the conditions used for image sensing are fixed. For example, in an electronic still camera, the resolution is determined by the number of the pixels of the CCD sensor and image sensing is performed using that resolution, i.e., the maximum resolution.

However, external devices that are connected to an image input device vary in resolution. For example, a high precision color printer has 5,000×8,000 pixels, while a standard color printer has 2,000×3,000 pixels and a TV monitor has 500×800 pixels. In this way, the resolution varies from one external device to another.

An image input device needs to output image data that has a resolution matching the resolution of the external device connected to it. If an external device is connected that has a resolution different from that of the image data obtained through image sensing, a process to convert the resolution must take place inside the image input device. Because such a conversion process requires time, the overall processing speed decreases to the same extent. Furthermore, where the resolution is to be increased, for example, the image data needs to be increased using approximation, which gives rise to the problem that errors are included in the image data.

The present invention addresses these problems. Its object is to provide an image input device in which conversion of resolution is not necessary or is made as simple as possible when image data is output to an external device.

SUMMARY OF THE INVENTION

When one external device or more than one external device is connected to the image input device, the external device to which image data is to be output is automatically determined or manually selected, and the format required by that external device is detected or set. An image sensing condition in the image input device, i.e., the integration cycle or scanning speed of the line sensor, for example, is changed in accordance with the format required by the external device, such as its resolution, for example, and image sensing is performed using image sensing conditions which are as close as possible to the required format.

A thinning or interpolation process takes place as needed with regard to the image data obtained through image sensing, and image data meeting the format is output to the external device.

DETAILED DESCRIPTION

Figure 1:
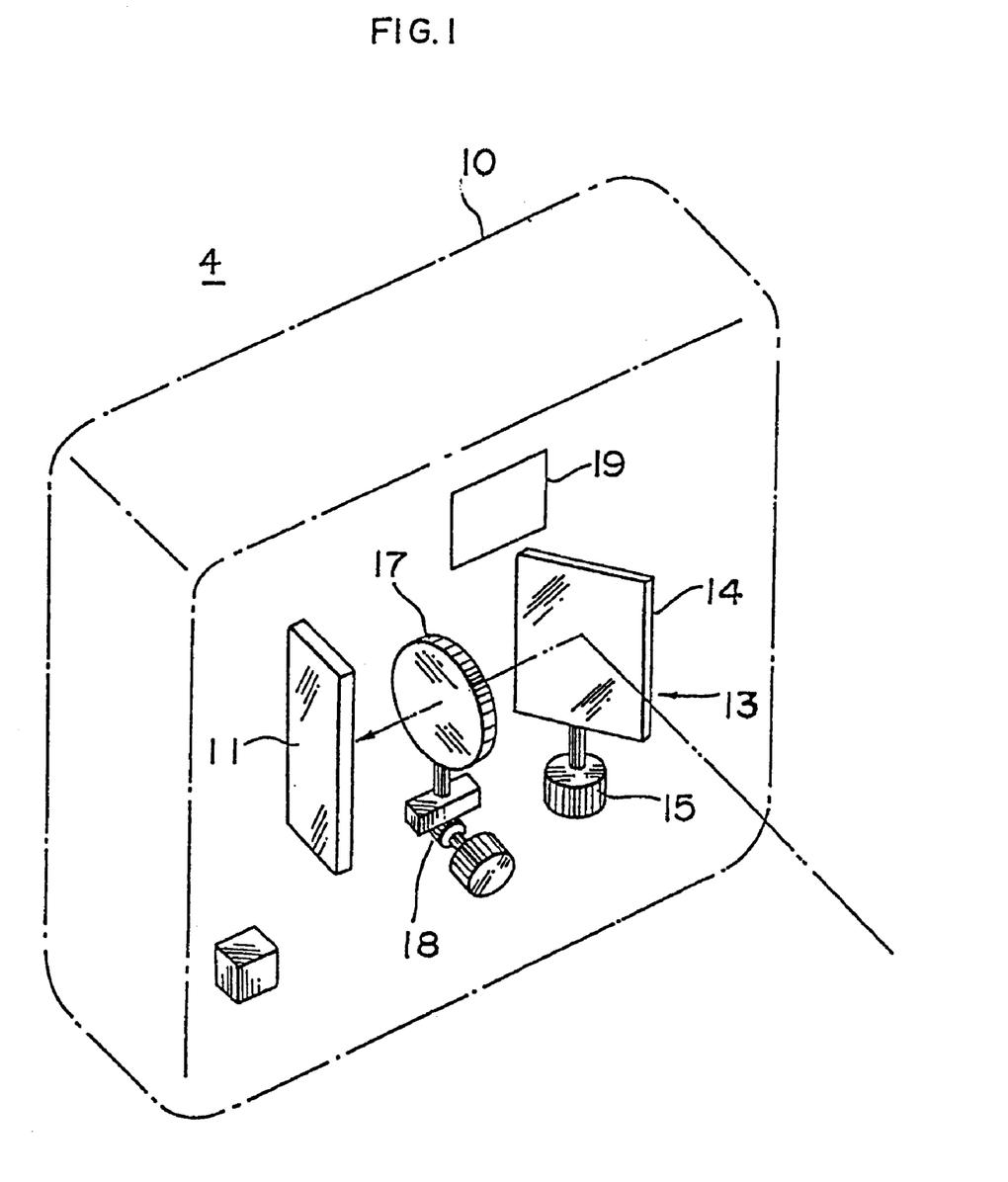
FIG. 1 shows in a simplified fashion one example of the construction of the optical system of an electronic camera.

FIG. 1 shows a simplified construction of an electronic camera 4 of the type which can incorporate the present invention. Electronic camera 4 is a compact line scanning-type camera using a battery as the main power source, and is equipped with line sensor 11 comprising multiple CCDs (Charge Coupled Devices) arranged in lines, line scanning mechanism 13, image forming lens 17, electric focus adjustment mechanism 18 and viewfinder 19. Other types of image sensing devices may be used as the line sensor 11, in place of the CCDs.

Line scanning mechanism 13 comprises scan mirror 14 and scan motor 15 that rotates the scan mirror. The rotational axis of scan mirror 14 is parallel to the direction of arrangement of the pixels of line sensor 11 (the main scanning direction). The optical image of the object that is reflected by scan mirror 14 and projected onto line sensor 11 by lens 17 is scanned while being moved in the direction perpendicular to the main scanning direction (the sub-scanning direction) by means of the rotation of scan mirror 14, and read line-by-line by sensor 11.

Line sensor 11 simultaneously latches image signals of pixels for one line in synchronization with a timing signal provided by a sub-scanning controller 54 (FIG. 2) at every integration cycle ts (line cycle ts) and outputs the image signals to an A/D converter in the order of the arrangement of the pixels. An image signal is obtained by performing photoelectric conversion of the total amount of the incident light on the pixel (exposure amount) during integration time t (exposure time t), and indicates the integration value of the illuminance of the light receiving surface of the pixel. Integration time t is determined by a timing signal provided by the sub-scanning controller, as in the case of integration cycle ts. In other words, integration time t is the time during which charge is accumulated in the light receiving member of line sensor 11, while integration cycle ts is the cycle for the transfer of the charge accumulated in the light receiving member.

As described above, since the optical image of the object is scanned while being moved over line sensor 11 by means of the rotation of scan mirror 14, the scanning speed in the sub-scanning direction is determined by the rotational speed of mirror 14. Resolution Rs in the sub-scanning direction is determined by the scanning speed in the sub-scanning direction and the integration cycle ts of line sensor 11. Further details of this operation are explained below.

Figure 2:
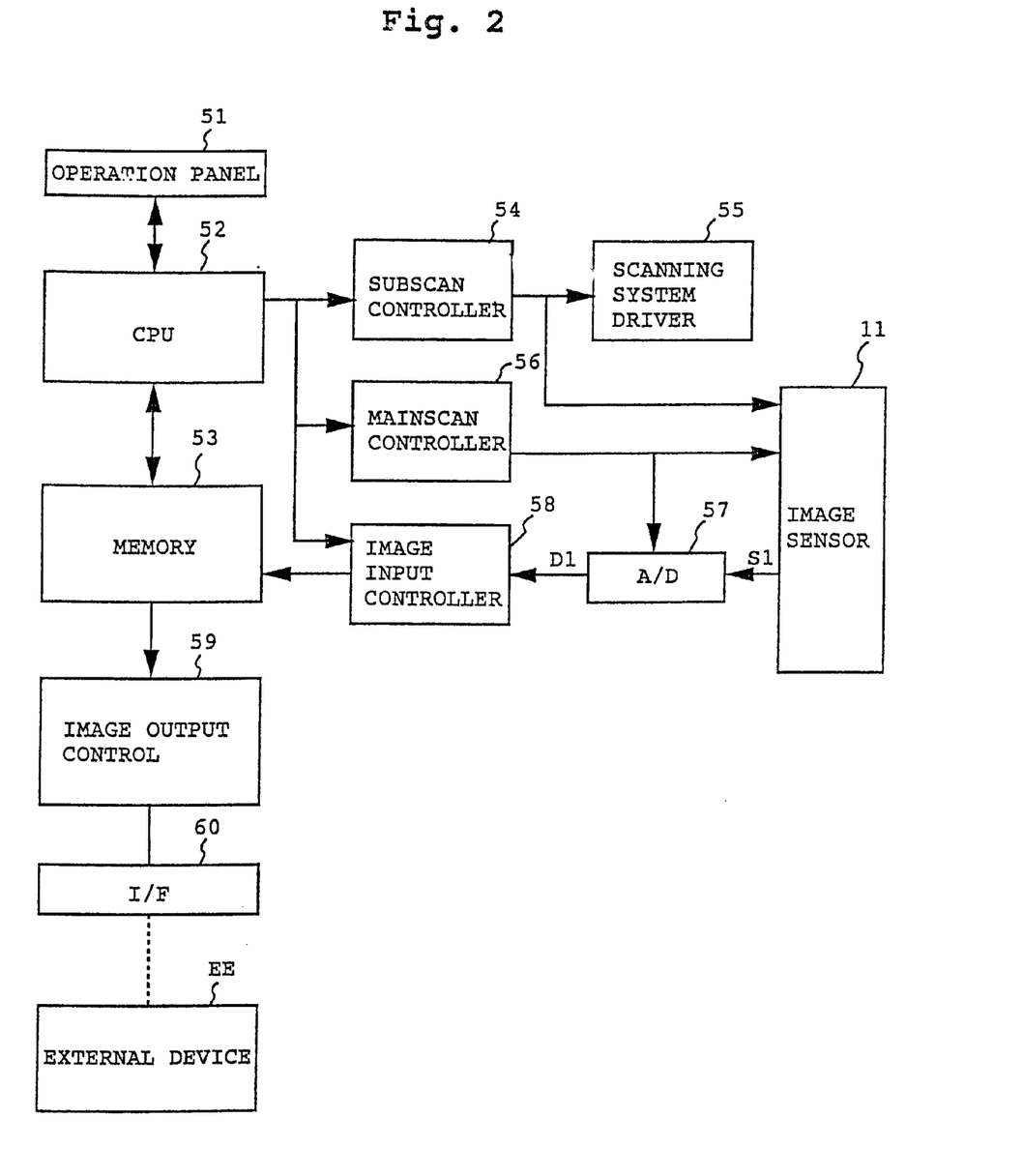
FIG. 2 is a block diagram of the control system of an electronic camera.

FIG. 2 is a block diagram of control system 100 of electronic camera 4. As shown in FIG. 2, control system 100 comprises operation panel 51, microprocessor (CPU) 52, memory 53, sub-scanning controller 54, scanning optical system driver 55, main scanning controller 56, A/D converter 57, image input controller 58, image output controller 59, output interface 60, and line sensor 11 described above.

Operation panel 51 has various operation switches for image sensing (image input) using electronic camera 4 and a display panel. In other words, while it is not shown in the form of a drawing, operation panel 51 has a power switch, a mode switch, a release button (release switch), a zoom switch and a switch for the selection of external device EE connected to output interface 60. When the release button is pressed halfway, the distance to the object is measured by a distance measurement sensor not shown in the drawings, and when it is pressed all the way, image sensing of the object begins.

CPU 52 performs various types of control pertaining to image sensing using electronic camera 4. For example, it manages memory 53, sets various parameters as to subscanning controller 54 and main scanning controller 56, and gives instructions to image input controller 58 and image output controller 59. It also performs compensation with regard to image data obtained through image sensing.

Memory 53 accumulates sensed image data. Memory 53 can have a capacity of approximately 18 MB, for example, where color image data of three main colors (red, green and blue) for 2,000×3,000 pixels is stored, with each of the pixels having eight bits per color.

Sub-scanning controller 54 is a block to control the scanning speed of line sensor 11 in the sub-scanning direction, integration cycle ts and integration time t. It sends control signals and timing signals to scanning optical system drive member 55 and line sensor 11 based on parameters set by CPU 52. Scanning optical system drive member 55 determines the rotational speed of scan motor 15 based on the control signals and timing signals from sub-scanning controller 54, and rotates scan mirror 14. Main scanning controller 56 sends timing signals to A/D converter 57 based on parameters set by CPU 52, and controls the reading from line sensor 11.

A/D converter 57 performs sample and hold (S/H) and A/D conversion with regard to an analog image signal SI output from line sensor 11, based on timing signals from main scanning controller 56, and converts the image signal into eight-bit digital image data D1 for each pixel.

Image input controller 58 controls the writing of image data D1, a digital signal obtained through conversion, into memory 53. Image input controller 58 also performs image compression in order to improve the usage efficiency of memory 53.

Image output controller 59 controls the output of the image data accumulated in memory 53 in a format suited to external device EE, through the instruction of CPU 52.

Output interface 60 is an interface to output image data to external devices EE and has various connectors that accommodate various types of external devices EE. Exemplary conditions of image data output to different external devices EE are as shown below.

a. To a high-precision color printer, a 5,000×8,000 pixel still image is output.

b. To a standard color printer, a 2,000×3,000 pixel still image is output.

c. 500×800 pixel image data for 30 frames is output per second to a TV monitor (NTSC).

d. Output to a personal computer is carried out using the format (resolution, still image) required by the personal computer.

During image sensing, CPU 52 performs the following control. Before image sensing is performed, CPU 52 polls external device EE, via output interface 60, to determine what format is required by the external device EE connected to the output interface. If external device EE does not respond to the inquiry regarding its format, an instruction is displayed on the display member of operation panel 51 for the operator to set the format by means of operation panel 51. When external device BE has responded or the operator has set the format, CPU 52 sets various parameters in main scanning direction control unit 56 and sub-scanning direction control unit 54 in accordance with the format which is required. Actual image sensing is then performed by line sensor 11 in accordance with the parameters thus set. Various compensation processes take place in memory 53 with regard to image data D1 obtained through the image sensing, and output to external device EE is carried out via output interface 60, using the set format.

The resolution Rs in the sub-scanning direction, which is part of the format, can be adjusted by controlling the sub-scanning direction scanning speed Vs and the integration cycle ts of line sensor 11. The resolution in the main scanning direction is adjusted by performing compensation processing with regard to the image data obtained through image sensing. This compensation processing includes thinning and interpolation.

The particular type of external device EE to which image data is to be output, and the format requirements of the external device, are determined by querying external device EE when a change in state of the connector of output interface 60 is detected, due to the plugging in or unplugging of the connector. This information can be based on a signal that is returned from external device EE. Alternatively, this determination may be performed by detecting the connector to which external device EE is connected.

Figure 3:
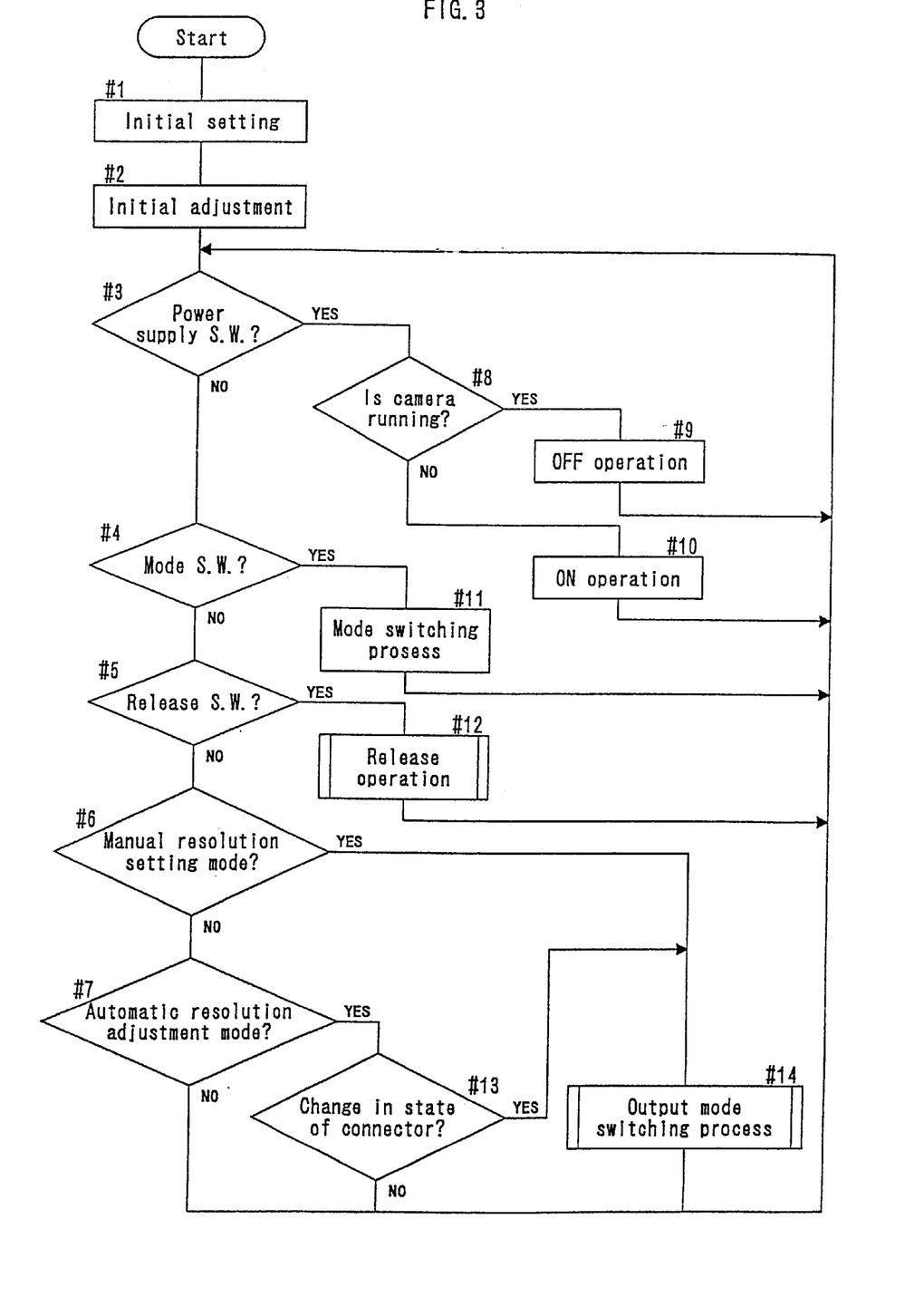
FIG. 3 is a flow chart of a main operation routine of an electronic camera.

The operation and manipulation of electronic camera 4 will now be explained in detail with reference to flow charts. FIG. 3 is a flow chart of the main routine showing the control procedure of CPU 52. When a battery is inserted or the camera is reset, initial setting of various parameters such as scanning speed Vs and integration cycle ts takes place (step #1) and initial adjustment of the positions of mirror 14, lens 17, etc., is performed (step #2). Where the state of the power supply switch has changed (YES in step #3), OFF operation processing takes place if the change in state has occurred while the camera is running (YES in step #8, step #9), and ON operation processing takes place if the change in state has occurred while the camera is not running (NO in step #8, step #10).

Where the state of the mode switch on operation panel 51 has changed (YES in step #4), a process to switch the mode is performed (step #11). In other words, an automatic resolution adjustment mode or a manual resolution setting mode is selected by means of the mode switch. Where the manual resolution setting mode is selected, resolution Rs can be manually set by operating operation panel 51 in the mode switching process of step #11, described below.

Where the state of the release switch has changed (YES in step #5), the release operation described below is performed (step #12).

Where the mode is the manual resolution setting mode (YES in step #6), an output mode switching process is performed to switch the output mode in accordance with resolution Rs that is set (step #14). Where the mode is the automatic resolution adjustment mode (YES in step #7), a change in state of the connector of output interface 60 is checked for, and if there is a change in state (YES in step #13), an output mode switching process is carried out in order to switch the output mode in accordance with newly connected external device EE (step #14).

Figure 4:
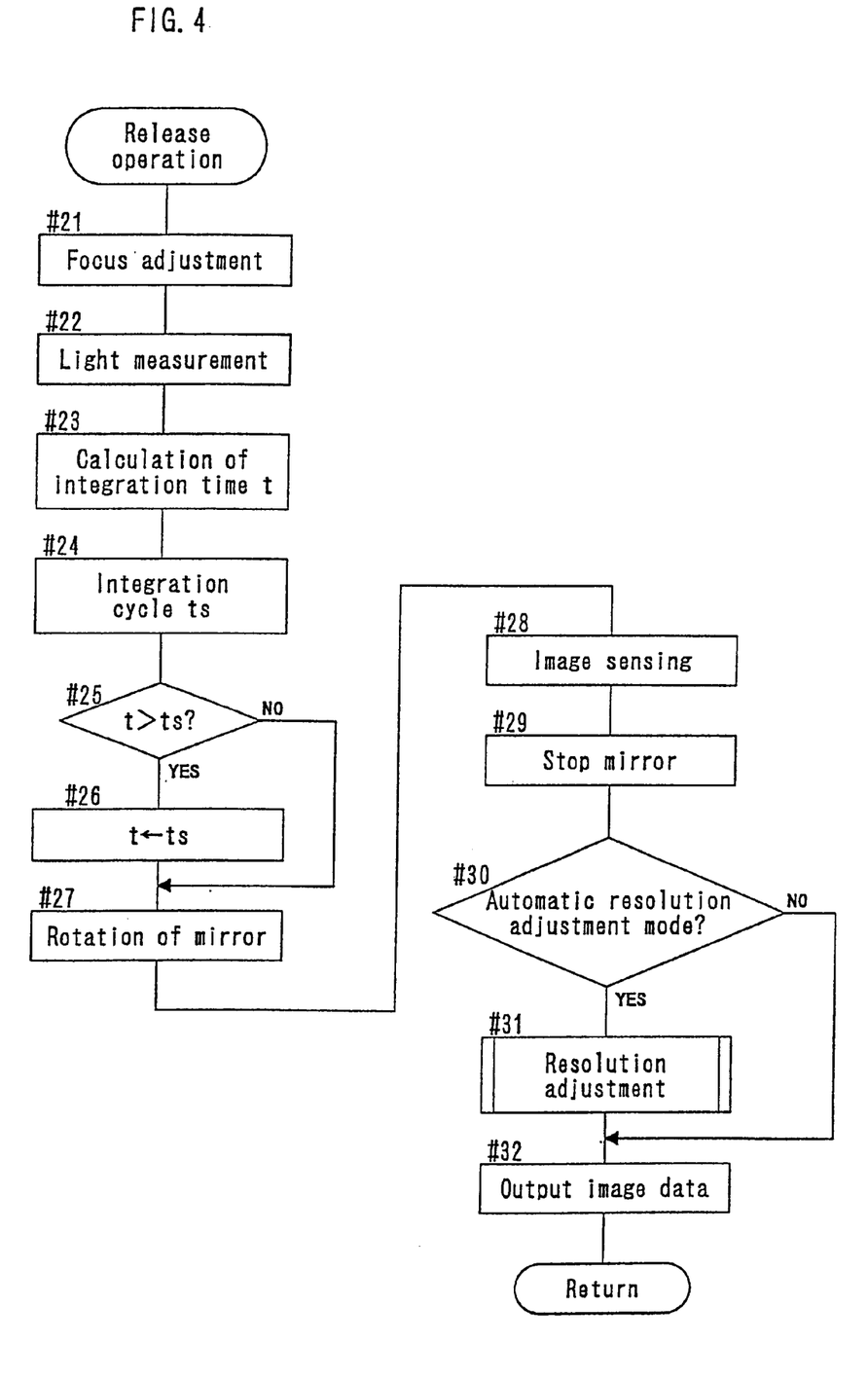
FIG. 4 is a flow chart showing a release operation subroutine.

FIG. 4 is a flow chart showing the shutter release subroutine of step #12 in FIG. 3. In the release operation in FIG. 4, the distance to the object is first measured by a distance measuring sensor not shown in the drawings, and focus adjustment of the lens is performed in accordance with the measured result (step #21). Light measurement is then performed by a photometric sensor not shown in the drawings (step #22), and an appropriate integration time t corresponding to the measured light value is calculated (step #23). The actual calculation of integration time t is performed by reading data from a ROM table, not shown in the drawings. Data regarding the relationship between the light measurement value and integration time t is pre-stored as a ROM table taking into account such factors as the sensitivity of line sensor 11 and the brightness of lens 17 (F-number). Normally, if the light measurement value increases, the appropriate integration time t decreases.

Integration cycle ts is set in accordance with resolution Rs (step #24). Integration cycle ts is the result of a calculation performed in step #82 in FIG. 7, which is described below. Resolution Rs here is the resolution in the sub-scanning direction. Since integration cycle ts may be made longer when resolution Rs decreases, by setting integration cycle ts depending on resolution Rs, an insufficient exposure does not easily result when a low resolution is acceptable.

The appropriate integration time t and the integration cycle ts are compared (step #25). Where the integration time t exceeds the integration cycle ts, control cannot be carried out as is and therefore integration time t is re-set so that integration time t is equal to integration cycle ts (step #26). Although this makes the integration time smaller and insufficient exposure results, a desired value may be set as the resolution Rs. In other words, priority is placed on the resolution in this case.

Rotation of mirror 14 is begun by means of the drive of scan motor 15 (step #27). After image sensing is performed in accordance with the set rotational speed and integration cycle ts (step #28), mirror 14 is stopped (step #29).

Where the mode is the automatic resolution adjustment mode (step #30), resolution adjustment is performed (step #31), after which image data is output to external device EE (step #32). During the resolution adjustment, the resolution in the main scanning direction is adjusted using thinning or interpolation.

Figure 5:
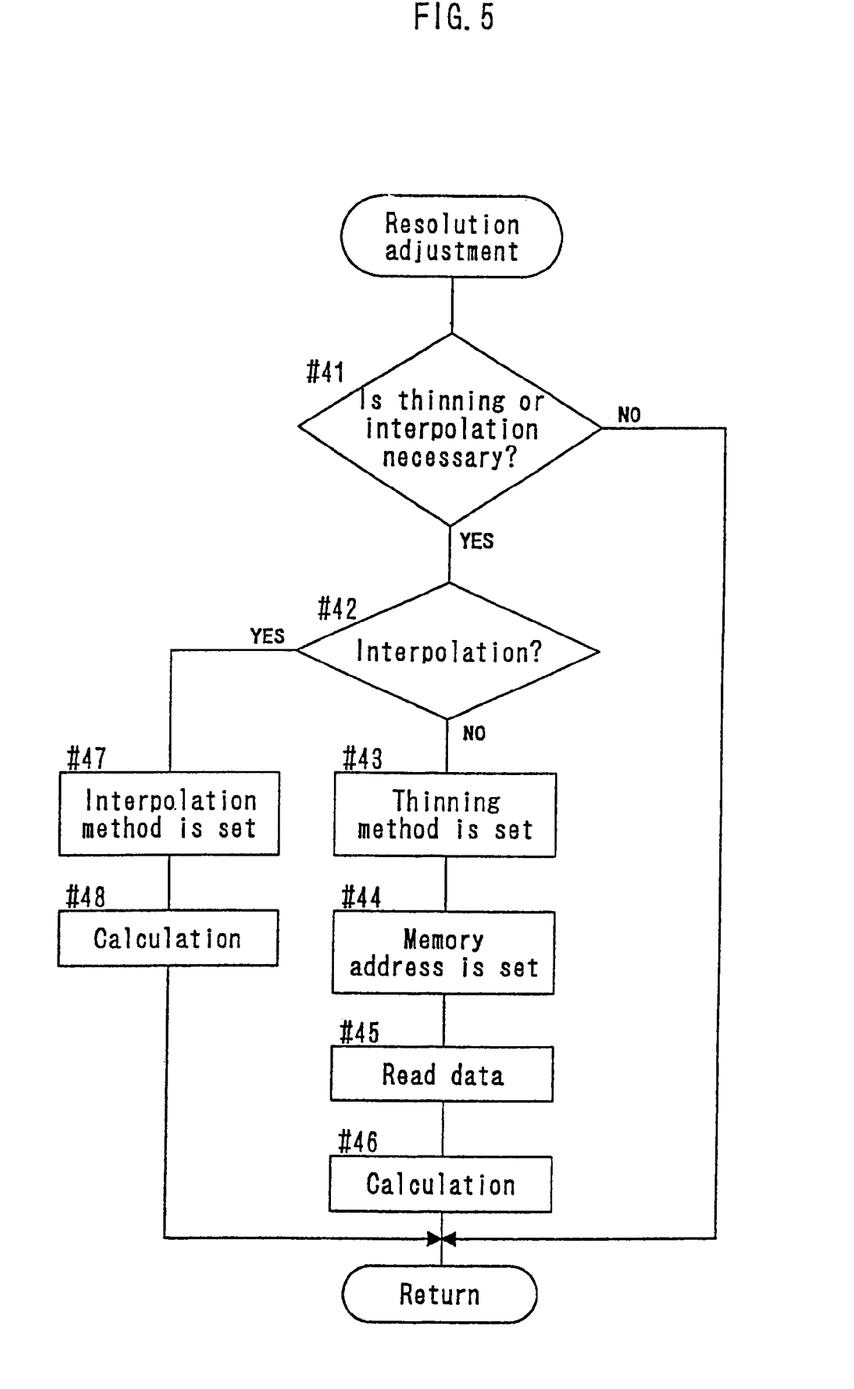
FIG. 5 is a flow chart showing a resolution adjustment subroutine.

FIG. 5 is a flow chart showing the resolution adjustment subroutine in step #31. In he resolution adjustment routine in FIG. 5, a determination is made, based on the resolution required by external device EE, whether thinning or interpolation in the main scanning direction is necessary (step #41). Where thinning is necessary (YES in step #41, NO in step #42), the method of thinning is set (step #43). There are two thinning methods: (1) simple thinning, and (2) thinning while calculation is performed. In the first method, if the resolution is to be reduced to half of that during image sensing, for example, every other pixel is removed or every other pair of adjacent pixels is removed. Where the resolution is to be reduced to one third of that during image sensing, two out of every three pixels are removed. In the second method, if the resolution is to be reduced to half of that during image sensing, the average value of two adjacent pixels is calculated and the calculation result is deemed to be one pixel value. These processes take place in the memory. For example, in the case of the first method, an address is specified for every other pixel in the memory in which image data for one line is stored, and the pixel values for the designated addresses are transferred to a different memory area and deemed as image data for one line.

When a thinning method is set, the memory addresses for the pixels to be read are set (step #44). The data for the addresses thus set is read (step #45) and in the case of the second method, calculation for the purpose of thinning is performed (step #46).

Where interpolation is necessary (YES in step #41, YES in step #42), the interpolation method is set (step #47). There are two interpolation methods: (1) simple interpolation, and (2) interpolation while calculation is performed. In the first method, if the resolution is to be made twice that of image sensing, for example, each pixel of a line is repeated, to add a pixel having the same pixel value as the original pixel, such that the additional pixel resides next to the original pixel, thereby doubling the number of pixels. In the second method, if the resolution is to be made twice that of image sensing, the average value of two adjacent pixels is calculated and pixels having the value of the calculation result are added in between the two pixels, thereby doubling the number of pixels. When the interpolation method is set, a calculation for the purpose of interpolation is performed (step #48). Where the result of step #42 is a positive answer, it means that the resolution required by external device EE exceeds 2,000×3,000 pixels, for example. Since the ratio of pixels in the main scanning direction and pixels in the sub-scanning direction is constant, the determination may be made by checking the number of pixels in either direction.

Figure 6:
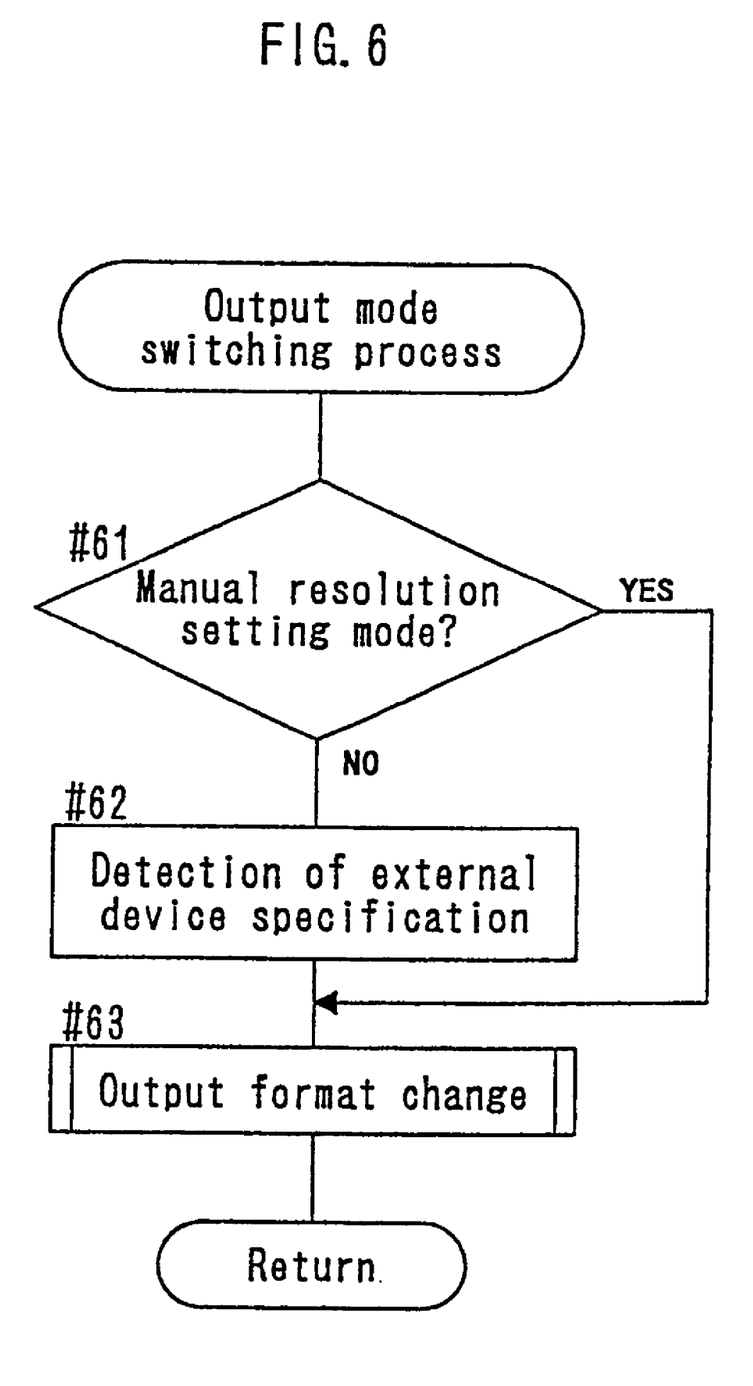
FIG. 6 is a flow chart showing a output mode switching subroutine.

FIG. 6 is a How chart showing the output mode switching subroutine in step #14 of FIG. 3. In the output mode switching routine in FIG. 6, where the mode is not the manual resolution setting mode, in other words where the mode is the automatic resolution adjustment mode (NO in step #61), an external device specification detection routine, to detect the resolution required by external device EE (i.e., the number of pixels) in the main and sub-scanning directions, is performed (step #62) and the output format is changed (step #63).

Figure 7:
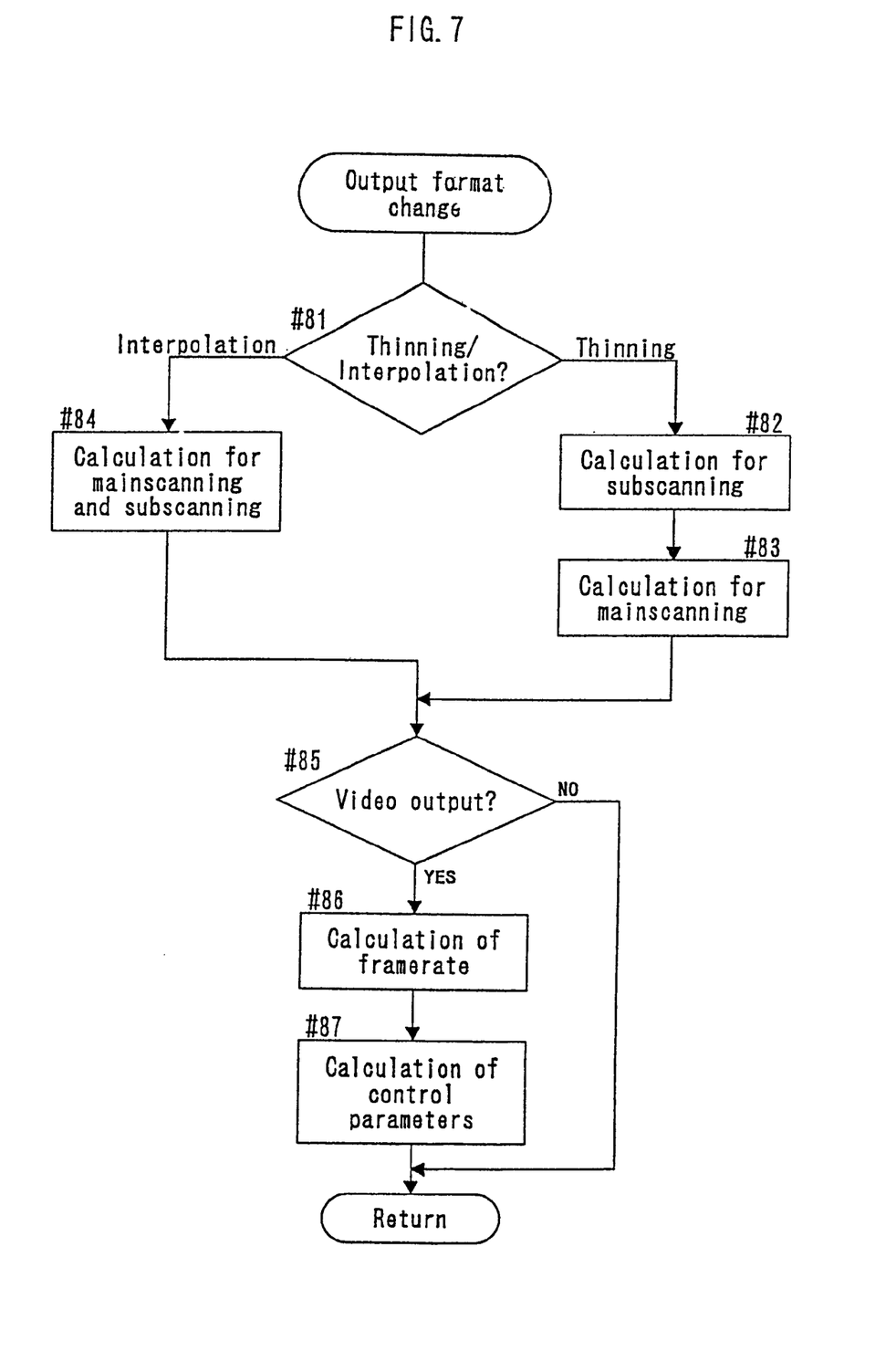
FIG. 7 is a flow chart showing a output format change subroutine.

FIG. 7 is a flow chart showing this output format change subroutine. In the output format change routine in FIG. 7, where thinning is performed, the sampling pitch, i.e., integration cycle ts, is calculated based on a set resolution Rs (step #82), and main scanning direction thinning control parameters are calculated (step #83).

The integration cycle time ts is calculated as ts (=scanning time Ts for one frame/ resolution Rs). The scanning time Ts for one frame is calculated by Ts=(the rotational angle of mirror 14 for one frame/scanning speed Vs). The rotational angle of mirror 14 for one frame corresponds to the angle of view of electronic camera 4. The scanning time Ts for one frame is set such that any camera shake which occurs between the start of scanning and the completion of scanning is not noticeable. In general, the scanning time Ts is equal to (1/focal length of the image sensing lens). While the amount of camera shake varies from person to person, the amount caused by an average person is used as the standard. Resolution Rs here is equal to the number of lines for one frame.

Where interpolation is performed, control parameters for interpolation in both the main and sub-scanning directions are calculated (step #84). Interpolation is carried out for both main and sub-scanning directions when interpolation is needed. Although the necessary resolution Rs can be obtained by making the integration cycle ts short with respect to the sub-scanning direction, if the integration cycle ts becomes too short, insufficient exposure frequently results. Therefore, the lower limit of integration cycle ts is provided in order to avoid such a situation.

Where video output is to be performed, (YES in step #85), the frame rate for the output image is calculated (step #86). The frame rate dictates the number of frames that is required per unit time where external device EE handles moving images. Control parameters for video output buffer memory are then calculated (step #87). These control parameters are parameters that control the addresses of the buffer memory when a frame image is repeatedly output from the buffer memory, in the case where external device EE requires a still image.

Based on the control parameters calculated in FIG. 7, processes in which various actual setting is performed take place in the flow charts of FIGS. 4 and 5 described above.

Using the embodiment described above, since the type of external device EE connected to the connector of output interface 60 is detected and various control parameters are calculated according to resolution Rs required by external device EE, after which the integration cycle ts is determined in accordance with that resolution, image sensing is performed using resolution Rs required by external device EE with regard to the subscanning direction. Therefore, only the resolution regarding the main scanning direction should be adjusted when image data D1 obtained through image sensing is output to external device EE, which simplifies the resolution conversion process and shortens the time needed for the conversion. At the same time, image data with fewer errors can be output.

As described above, image sensing can be carried out using the best conditions corresponding to the format of external device EE, and image data corresponding to various formats required by external device EE can be output.

Further, where a low resolution may be used, the integration cycle ts can be made long so that insufficient exposure does not easily result.

The resolution in the sub-scanning direction was adjusted according to the type of external device by means of changing integration cycle ts in the embodiment described above. A second embodiment in which the resolution in the sub-scanning direction is adjusted by changing the rotational speed of mirror 14, or in other words, scanning speed Vs in the sub-scanning direction, will be explained below.

Figure 8:
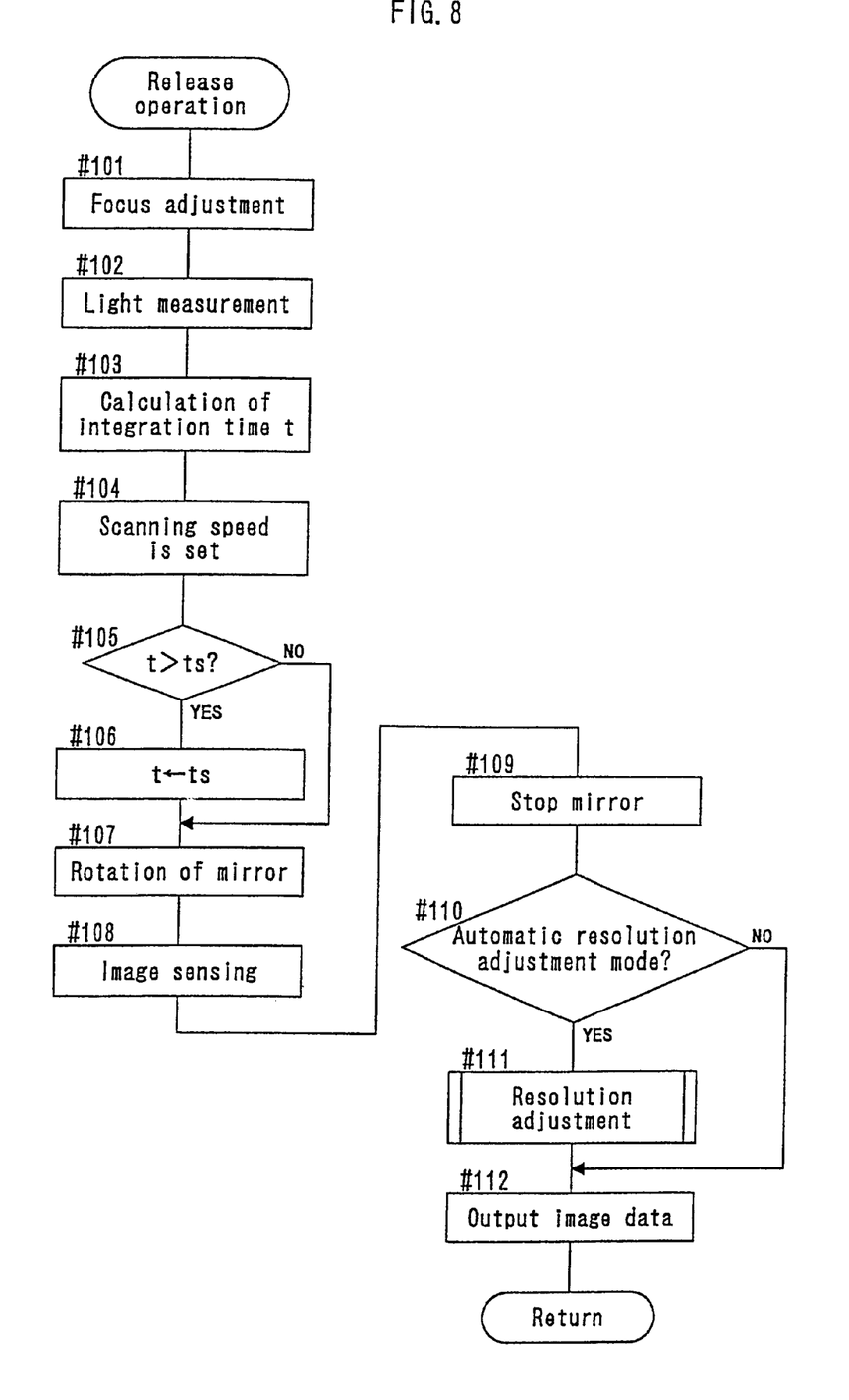
FIG. 8 is a flow chart showing a second embodiment of a release operation subroutine.

In the second embodiment, the release operation shown in FIG. 8 is employed in place of the release operation shown in FIG. 4 pertaining to the first embodiment. Since other operations are quite similar to those in the first embodiment described above, they will be omitted from the discussion. The differences between the first and second embodiments are explained below.

In the flow chart in FIG. 8, scanning speed Vs is set in step #104 in place of the setting of integration cycle ts in step #24 in the first embodiment shown in FIG. 4. In other words, in the second embodiment, integration cycle ts is set at a value that allows a certain range of freedom in exposure control regardless of resolution Rs, while scanning speed Vs is changed depending on resolution Rs. Scanning speed Vs is calculated in step #82 of the flow chart in FIG. 7 as Vs=(rotational angle for one frame/scanning time for one frame). The scanning time for one frame is calculated as (integration ts×resolution Rs).

In addition, with regard to the flow chart shown in FIG. 7 pertaining to the first embodiment, the calculation of the subscanning direction sampling pitch in step #82 is not performed in the second embodiment. In other words, integration cycle ts is not variable but is fixed at a certain value.

In the second embodiment, where a low resolution may be used, image sensing can be performed at a high speed with the same exposure sensitivity by setting scanning speed Vs in accordance with resolution Rs, as a result of which camera shake does not easily occur.

In the embodiments above, thinning or interpolation was used as the method to adjust the resolution, but other methods may be used as long as they are appropriate for the purpose of adjustment of the resolution.

In the embodiments above, the scanning in the sub-scanning direction was performed by rotating mirror 14, but a construction in which line sensor 11 is moved in the secondary direction without rotating or using mirror 14 may be used.

In the embodiments described above, the construction was such that, with regard to the resolution in the main scanning direction, image data D1 was initially stored in memory 53 and then adjusted through thinning. However, where a line sensor that can change the number of pixels to be read is used, the resolution may be adjusted when image signals S1 are sent from the line sensor. By using such a construction, image sensing corresponding to required resolution Rs in both main and sub-scanning directions can be carried out, rendering unnecessary the performance of thinning after image sensing. Further, by using a high-sensitivity and high-density line sensor, interpolation may be rendered unnecessary even where a high resolution is required, so that image sensing corresponding to all required resolutions Rs may be performed.

Other than as described above, the construction, configuration and dimensions of electronic camera 4, the construction of control system 100, control details, control timing, process details and the order of processes may be changed in accordance with the essence of the present invention. The present invention may be applied in various other image input devices such as electronic cameras and image readers equipped with area sensors, in addition to line scanning electronic camera 4.

Using the present invention, an image input device may be obtained that does not require, or simplifies to the extent possible, the process of resolution conversion when image data is output to an external device.

What is claimed is:

1. A sensing device for sensing an image and outputting image data to an external device via an output interface, said image sensing device comprising:

a determination means which determines a data format required by the external device connected to said output interface, and a changing means which changes image sensing conditions pertaining to the manner in which the image is captured in accordance with the determined format of said external device;

wherein said image sensing conditions determine the number of pixels which are captured.

2. The sensing device as claimed in claim 1 wherein said determination means includes a detection means which detects a specification for the external device connected to the output interface.

3. The sensing device as claimed in claim 1 wherein said determination means includes an operation panel which is manually operable and sets the data format.

4. The sensing device as claimed in claim 1 wherein said changing means changes a resolution for the sensing of said image.

5. The sensing device as claimed in claim 1 wherein said image sensing conditions include a scanning speed of an image sensor used to capture said image.

6. The sensing device as claimed in claim 1 wherein said image sensing conditions determine the manner in which an image is captured in a sub-scanning direction.

7. The sensing device as claimed in claim 1, further including an adjusting means for adjusting the number of pixels that have been captured.

8. The image sensing device as claimed in claim 7, wherein said changing means changes the number of pixels in one direction, and said adjusting means changes the number of pixels in another direction which is perpendicular to said one direction.

9. A sensing device for sensing an image and outputting image data to an external device via an output interface, said image sensing device comprising;
an image scanning means which has a line sensor and scans the image by moving the line sensor with respect to the image;
a determination means which determines a resolution required by the external device connected to said output interface, and
a changing means which changes scanning speed of the line sensor in a
subscan direction to obtain the required resolution in the subscan direction.

10. The sensing device as claimed in claim 9 further comprising an image processing circuit which performs compensation processing with regard to the image data obtained through image sensing, in order to obtain a required resolution in a main scan direction.

11. The sensing device as claimed in claim 9 wherein said determination means includes a detection means which detects a specification for the external device connected to the output interface.

12. The sensing device as claimed in claim 9 wherein said determination means includes an operation panel which is manually operable and sets the resolution.

13. A sensing device for sensing an image and outputting image data to an external device via an output interface, said image sensing device comprising;
an image scanning means which has a line sensor and scans the image by moving the line sensor with respect to the image;
a driving circuit which drives said line sensor in successive line cycles;
a format determination means which determines a resolution required by the external device connected to said output interface; and
a changing means which changes said line cycle to obtain the required resolution in a subscan direction.

14. The sensing device as claimed in claim 13 further comprising an image processing circuit which performs compensation processing with regard to the image data obtained through image sensing, in order to obtain a required resolution in a main scan direction.

15. The sensing device as claimed in claim 13 wherein said determination means includes a detection means which detects a specification for the external device connected to the output interface.

16. The sensing device as claimed in claim 13 wherein said determination means includes an operation panel which is manually operable and sets the resolution.

17. A sensing device for sensing an image and providing image data to an external device via an output interface, comprising;
an image scanning means having a line sensor which scans a plurality of lines of an image to be sensed;
a format determination means which determines a resolution required by an external device connected to said output interface; and
means for controlling the number of lines of an image which are scanned by said line sensor in accordance with a determined resolution.

18. The sensing device of claim 17, wherein said controlling means adjusts the amount of time required to scan a line of an image in accordance with a determined resolution.

19. The sensing device of claim 17 wherein said image scanning means includes a means for moving an image relative to said line sensor, and said controlling means adjusts the relative speed of movement of the image in accordance with a determined resolution.

20. A sensing device for sensing an image and outputting image data to an external device via an output interface, said image sensing device comprising:
a determination means which determines a data format required by the external device connected to said output interface and
a changing means which changes image sensing conditions pertaining to the manner in which the image is captured in accordance with the determined format of said external device;
wherein said image sensing conditions include an integration cycle of an image sensor used to capture said image.

21. A sensing device for sensing an image and outputting image data to an external device via an output interface, said image sensing device comprising:
a determination means which determines a data format required by the external device connected to said output interface, and
a changing means which changes image sensing conditions pertaining to the manner in which the image is captured in accordance with the determined format of said external device;
wherein said image sensing conditions determine the manner in which an image is captured in a sub-scanning direction;
further including means for adjusting resolution in a main scanning direction by performing one of: thinning and interpolation.

22. A method for controlling an image sensing device that is connected to an external device via an output interlace, comprising the steps of:
polling the external device via said output interface;
determining a data format required by the external device in response to said polling; and
adjusting image sensing conditions for said image sensing device in accordance with the determined data format;
further comprising the steps of:
detecting a failure of the external device to response to said polling;
displaying a prompt for a user to manually enter a data format in response to said detection; and
adjusting image sensing conditions for said image sensing device in accordance with the manually entered data format when the external device fails to respond.

23. A sensing device for sensing an image and outputting image data to an external device via an output interface, said image sensing device comprising:

a determination means which determines a data format required by the external device connected to said output interface, and a changing means which changes image sensing conditions pertaining to the manner in which the image is captured in accordance with the determined format of said external device;

wherein said image sensing conditions determine the number of times to capture an image.

24. The sensing device as claimed in claim 23, wherein said changing means changes a scanning speed ot an image sensor used to capture the image based on said number of times to capture the image.

25. The sensing device as claimed in claim 24, wherein the sensing device scans the image line by line, and the number of times corresponds to the number of scanning lines.

26. The sensing device as claimed in claim 23, wherein the sensing device scans the image line by line, and said changing means changes a line cycle of the scanning.

* * * * *